US006205464B1

(12) United States Patent
Cobb et al.

(10) Patent No.: US 6,205,464 B1
(45) Date of Patent: Mar. 20, 2001

(54) SYSTEM FOR BUILDING OPTIMAL COMMIT TREES IN A DISTRIBUTED TRANSACTION PROCESSING SYSTEM

(75) Inventors: Edward Ellis Cobb, Saratoga, CA (US); Simon Antony James Holdsworth, Andover; Iain Stuart Caldwell Houston, Bradford Abbas, both of (GB); Stanley Alan Smith, Austin, TX (US)

(73) Assignee: International Businesss Machines Corporation, Armonk, NY (US)

( * ) Notice: Subject to any disclaimer, the term of this patent is extended or adjusted under 35 U.S.C. 154(b) by 0 days.

(21) Appl. No.: 08/307,212

(22) Filed: Sep. 16, 1994

(51) Int. Cl.$^7$ .................................................. G06F 9/00

(52) U.S. Cl. ........................................ 709/101; 709/707

(58) Field of Search .......................... 395/700, 650; 709/100, 101, 102, 103, 104, 106, 108, 226; 710/100; 711/6; 707/10, 8, 9

(56) References Cited

U.S. PATENT DOCUMENTS

| 5,241,675 | * | 8/1993 | Sheth et al. | 395/600 |
|---|---|---|---|---|
| 5,335,343 | * | 8/1994 | Lampson et al. | 395/575 |
| 5,358,982 | * | 10/1994 | Britton et al. | 370/110.1 |
| 5,363,505 | * | 11/1994 | Maslak et al. | 395/650 |
| 5,371,886 | * | 12/1994 | Britton et al. | 395/600 |
| 5,390,302 | * | 2/1995 | Johnson et al. | 395/325 |
| 5,504,899 | * | 4/1996 | Raz | 395/650 |

FOREIGN PATENT DOCUMENTS

0457116A2   11/1991   (EP) .

OTHER PUBLICATIONS

Conference Proceedings of the 8th annual International Phoenix Conference on Computers and Communications, Mar. 22–24, 1989, Scottsdale, Arizona, "The Analysis of a Commercial Implementation of Multiple 2 Phase Commitment Protocols Within a Single Operating System Integrity Control Layer", Egolf et al, pp 497–501.

Proceedings of the 10th International Conference on Distributed Computing Systems, May 28–Jun. 1, 1990, Paris, FR, "Open Commit Protocols for the Tree of Processes Model", Rothermel et al, pp 236–244.

Sigmod Record, vol. 20, No. 2, Jun. 1991, NY, "An Optimistic Commit Protocol for Distributed Transaction Management", Levy et al, pp 88–97.

Object Transaction Service, Aug. 4, 1994, Object Management Group, Inc., pp. 1–103.

* cited by examiner

Primary Examiner—Majid Banankhah
(74) Attorney, Agent, or Firm—David A. Mims, Jr.; Mark S. Walker

(57) ABSTRACT

A system and method for reducing message traffic during two phase commitment in a distributed transaction processing system. Transactional objects manage transactions in a distributed system. A coordinator object is responsible for ensuring data consistency by enforcing atomic transaction changes. Any change to one or more resources by a transaction is either made at all or none of the resources. Distributed transactions use interposition to create subordinate coordinator for domains other than the primary domain. Each subordinate coordinator controls transaction commitment of all resources within that domain via a single message sequence per coordinator. Dynamic registration of subordinate coordinator resources ensures that the subordinate coordinator is not added to the commit tree of the root coordinator unless it has recoverable resources. Dynamic registration minimizes the size of the commit tree thereby minimizing the number of messages transmitted during commitment processing.

8 Claims, 4 Drawing Sheets

SYSTEM FOR BUILDING OPTIMAL COMMIT TREES IN A DISTRIBUTED TRANSACTION PROCESSING SYSTEM

BACKGROUND OF THE INVENTION

1. Field of the Invention

The present invention relates to transaction processing systems and more particularly to distributed transaction processing systems. Still more particularly, the present invention relates to the use of computer implemented objects to increase the efficiency of transaction processing systems by building optimal commit trees for transaction commitment processing.

2. Background and Related Art

Computer implemented transaction processing systems are used for critical business tasks in a number of industries. A transaction defines a single unit of work that must either be fully completed or fully purged without action. For example, in the case of a bank automated teller machine (ATM) from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and actual occurrences.

Distributed transaction processing involves a transaction that affects resources at more than one physical or logical location. In the above example, an ATM transaction affects resources managed at the local ATM device as well as bank balances managed by a bank's main computer. A distributed transaction may not be physically distributed but may involve cooperating tasks that must be completed in synchrony for successful transaction completion.

The X/Open Company Limited (X/Open is a trademark of X/Open Company Ltd.) has promulgated a guide that describes one model for implementing distributed transaction processing. The *X/Open Guide, Distributed Transaction Processing Reference Model*, October, 1991, discusses the components of a distributed transaction system and the interrelationships between them. The X/Open Distributed Transaction Processing Model (the DTP Model) describes three main components: an Application Program(AP), a Transaction Manager (TM), and one or more Resource Managers (RMs). The Application Program uses and modifies the resources controlled by one or more of the Resource Managers. The Transaction Manager is responsible for global transactions and coordinates the decision whether to commit or roll-back the actions taken by the Resource Managers. (Commit causes the resources to be updated while roll-back causes all work to be discarded returning the resources to the state they were in upon transaction initiation.) The Resource Managers manage specific resources. Resource managers may include a database management system (DBMS), a file system, or similar resource.

Object oriented programming systems are designed to increase the efficiency of program development by enabling object reuse and simplifying system maintenance through clear separation of function. Each object in an object oriented system encapsulates the data for that object and the procedures or methods for operating on that data. Encapsulation means that the data for an object can be manipulated only by that object using the defined methods. Object oriented systems also implement object inheritance. Inheritance allows a more specific object to be derived from a general object. The more specific object can "inherit" all of the data and methods of the parent object, but can override selected data and methods and add others to implement its unique function.

The application of object oriented techniques to transaction processing systems raises many new issues but offers opportunities to increase system efficiency through the use of object oriented principles. The Object Management Group, Inc. (OMG) has established standards for interoperable object oriented systems. The overall architecture defined by OMG is the Common Object Request Broker Architecture (CORBA). CORBA defines the interactions between objects, and in particular, between distributed objects in different computer systems. OMG has accepted submission of a proposal to standardize transaction processing in object oriented systems. This submission, entitled the *Object Transaction Service(OTS)*, sets forth the requirements for object services necessary to implement a transaction processing system. The OTS specification uses many of the unique capabilities of object oriented systems. The OTS model, however, is designed to be interoperable with the X/Open DTP model and with existing procedural transaction processing systems.

The X/Open DTP model describes and many commercial transaction processing systems use what is termed a "two phase commit" to decide whether or not to commit the changes made by a transaction. The first phase involves the transaction manager determining whether each of the resource managers believes it is able to successfully commit the changes made by the transaction. If any resource manager indicates that it cannot, or fails to respond, the transaction manager causes the changes to be rolled back in each resource manager. If all of the responses are positive, then the transaction manager orders all of the resource managers to commit the transaction.

One technical problem caused by the two phase commit is the large number of messages that may be generated in a distributed processing system. The transaction manager sends a first phase message to each participating resource manager, each resource manager responds, then the transaction manager sends a second message to each of the resource managers to either commit or roll back the transaction. This number of messages may not be required in every case. Resource managers may have become involved in a transaction when the application program requested read-only data from that resource. In other instances, a resource manager may have been indicated as a potential update location, but no actual change to the data may have occurred. In both of these cases the two phase commit messages were unnecessary. Currently, exporting systems have no way of tracking read-only access or access without changed data. These systems require at least the first phase message being sent to each subordinate coordinator followed by a response from the subordinate coordinator, even if the response is that the coordinator handled read-only data and need not be further involved in the transaction.

The problem therefore exists to design a distributed transaction processing system that causes messages to be sent only to those subordinate coordinators that have recoverable resources involved in the transaction, and, that causes exactly one commit sequence to be sent to each coordinator that contains one or more recoverable resources.

SUMMARY OF THE INVENTION

The present invention is directed to a system that minimizes message traffic during two phase commit processing by using interposition and dynamic registration of subordinate objects to limit the size of the commit tree. Interposition allows a subordinate coordinator to perform coordination functions for a particular domain and to cooperate in transaction completion for the overall system. Dynamic registration allows each subordinate coordinator to delay registration with its superior coordinator until there are recoverable resources in the domain it controls. The commit tree for the transaction is not changed to include a subordinate coordinator until registration. Therefore, subordinate coordinators without recoverable resources are not contacted during commit processing.

The present invention is directed to a method for minimizing message traffic in a computer implemented transaction processing system, the transaction processing operating on one or more processors each having a plurality of resources that can be changed by the transaction processing system, the method comprising the steps of: receiving a transaction request to modify one or more of the plurality of resources and assigning the transaction a global identifier; creating a first coordinator for controlling modification of the one or more resources; importing the transaction request to a plurality of subordinate transaction manager domains containing resources, by creating a subordinate coordinator for each of the domains for controlling modification of the one or more resources in the domain, and encapsulating the global identifier; and dynamically registering the subordinate coordinators with the first coordinator only when the resources of the subordinate coordinator are modified by a transaction.

It is therefore an object of the present invention to provide a system that minimizes system messages during two phase commit processing of distributed transactions.

It is yet another object of the invention to provide an improved system and method for interposition using system objects to encapsulate the superior coordinator object reference and the transaction identifier.

It is still another object of the invention to provide a system in which subordinate coordinator objects are registered dynamically.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
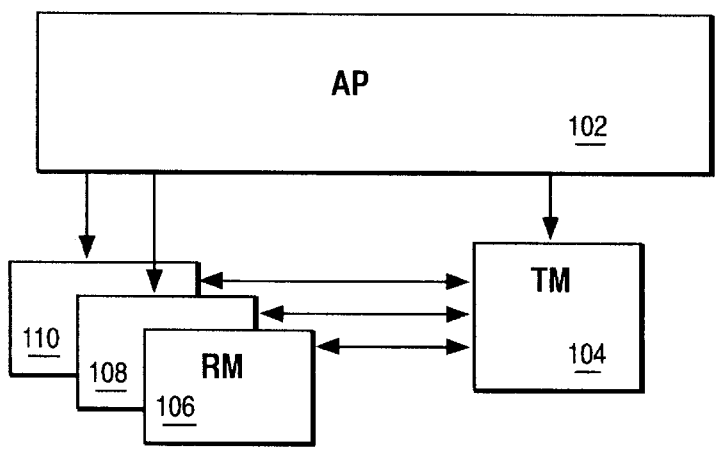
FIG. 1 is a block diagram illustrating the X/Open Distributed Transaction Processing Model.

The X/Open Distributed Transaction Processing (DTP) model is shown generally i FIG. 1. An Application Program 102 executes and causes data or other resources to change state. Resources are managed by a Resource Managers 106 108 110, each of which can be a database management system (DBMS), file management system or similar system. The Resource Managers may be distributed on computer systems remote from the system executing the Application Program 102 or they may be implemented as separate processes within the same computer system. Transaction Manager 104 controls the completion of processing for each particular transaction initiated by Application Program 102. Transaction Manager 104 coordinates the actions of the Resource Managers to ensure that all resources are in a consistent state at the end of the transaction. This coordination ensures that the transaction appears to operate atomically, i.e. the transaction either changes all resources associated with the transaction or it changes none of them.

Figure 2:
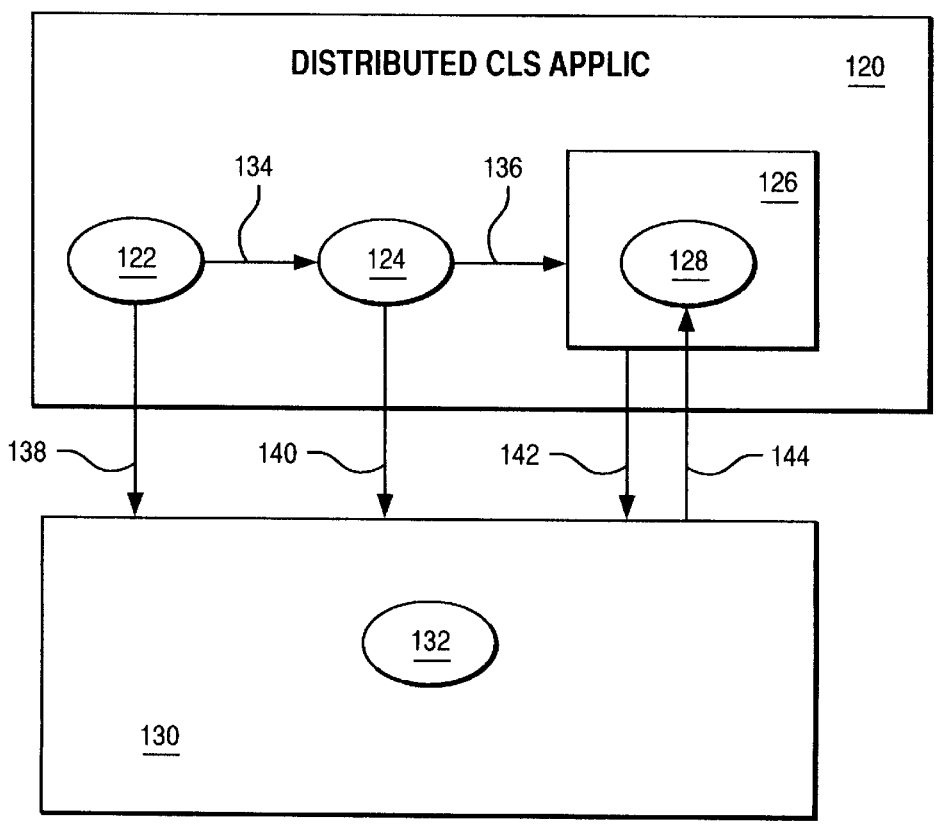
FIG. 2 is block diagram illustrating the OMG Object Transaction Services model.

The Object Transaction Services model defined by the Object Management Group is shown generally in FIG. 2. A distributed client/server (C/S) application is shown at 120. The application 120 comprises a number of objects that exchange messages to accomplish the actions required by the transaction. The objects present in the application include one or more Transactional Clients 122 that invoke operations of transactional objects. The object that begins a transaction is the transaction originator and the originator sends a message 138 to the Transactional Service at the beginning and end of a transaction. A transactional object is an object whose behavior is affected by being invoked within the scope of a transaction. A transactional object typically contains or refers to persistent data that can be modified by transactional requests. Persistent data is that data that will survive a system restart. Persistent data typically resides on disk storage devices, non-volatile memory or similar devices.

Transactional objects are used to implement two types of application servers: a transactional server 124 and a recoverable server 126. A recoverable server implements protocols necessary to ensure that all participants in the transaction agree on the outcome, either to commit the transaction or roll-back the transaction, and to be able to recover from failure. A recoverable object is a transactional object, but not all transactional objects are recoverable. Non-recoverable transactional objects may implement their state using some other recoverable object.

A recoverable object must participate in Transaction Service 130 protocols. Transaction Services 130 maintain certain data defining the scope of each transaction as transaction context 132. The transaction context 132 is associated with each ORB-aware thread (Object Request Broker (ORB) characteristics are defined by the OMG CORBA architecture.) The transaction context 132 is submitted with each request generated from the client application and is used to define operational environment characteristics where the request is processed. Contents of the transaction context 132 can include a reference to the transaction coordinator, ancestor references for nested transactions, a globally unique transaction id for the transaction coordinator and implementation specific data understood by the subordinate transaction coordinator.

Recoverable objects participate in Transaction Services 130 by registering a Resource 128 with the Transaction Service. The Transaction Service 130 drives the commit protocol (the two phase commit) by contacting those resources registered for a transaction.

A transactional server 124 is a collection of one or more objects whose behavior is affected by the transaction but have no recoverable states of their own. A transactional server implements transactional changes using other recoverable objects. A transactional server does not participate in the completion of the transaction but can force the transaction to be rolled back by sending a roll back message 140.

A recoverable server 126 is a collection of objects, at least one of which is recoverable. A recoverable server participates in the protocols by registering one or more Resource objects 128 with the Transaction Service using a Registration message 142. The Transaction Service drives the commit protocol by issuing requests 144 to the resources registered for a transaction.

Figure 3:
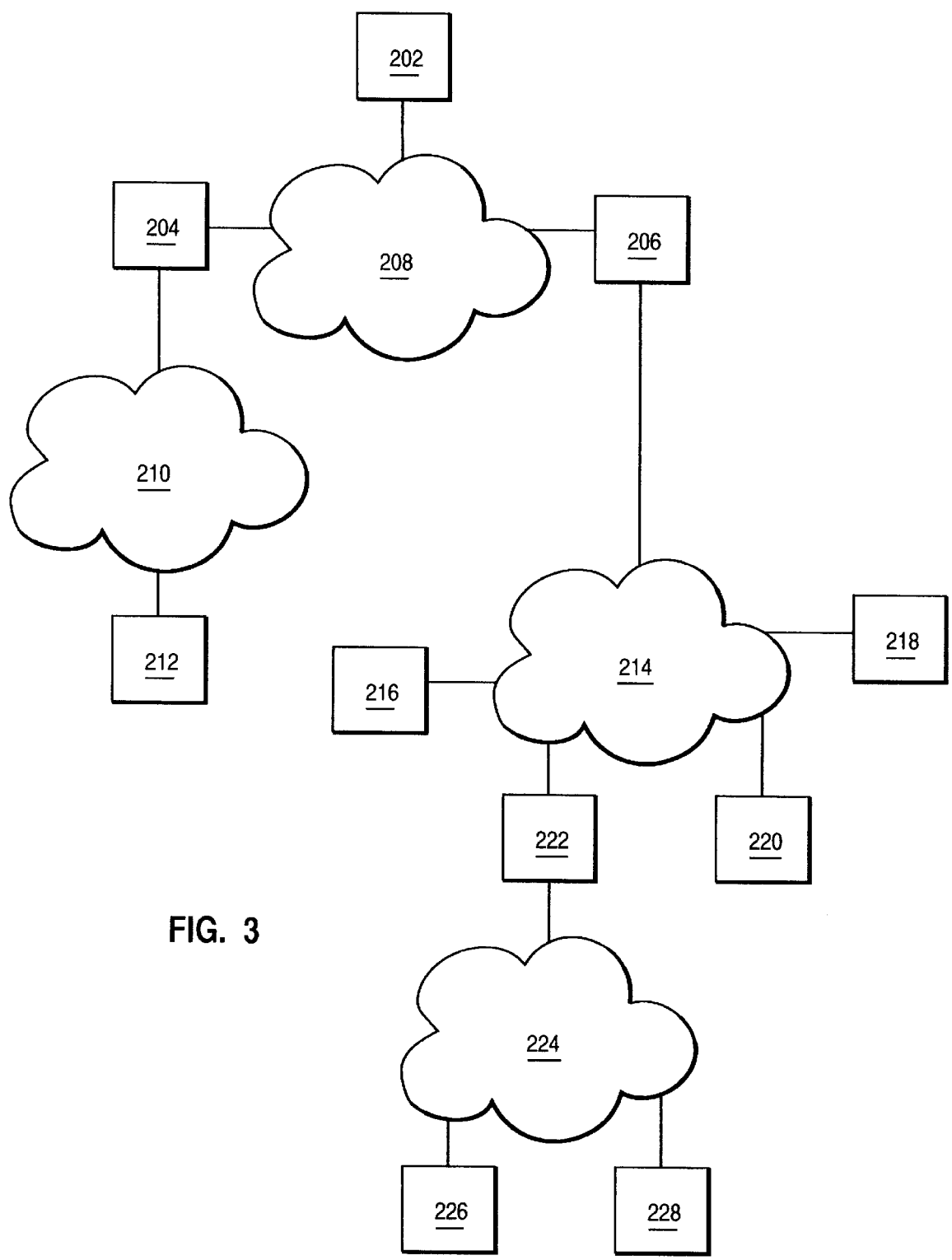
FIG. 3 is a block diagram illustrating a system of distributed computers interconnected by networks in which the preferred embodiment of the present invention is applied.

An example of a distributed processing system according to the present invention is shown generally in FIG. 3. Several computer systems are interconnecting using communication networks. For example, systems 212 and 204 are connected by network 210. Systems 204, 202, and 206 by network 208. Systems 206, 216, 218, 220, and 222 by network 214 and systems 222, 226, and 228 by network 224. The networks can be any known local area network (LAN) or wide area network (WAN), including token ring, Ethernet or other network. The "network" can also be the communication bus between multiple processes in a single computer system.

Figure 4:
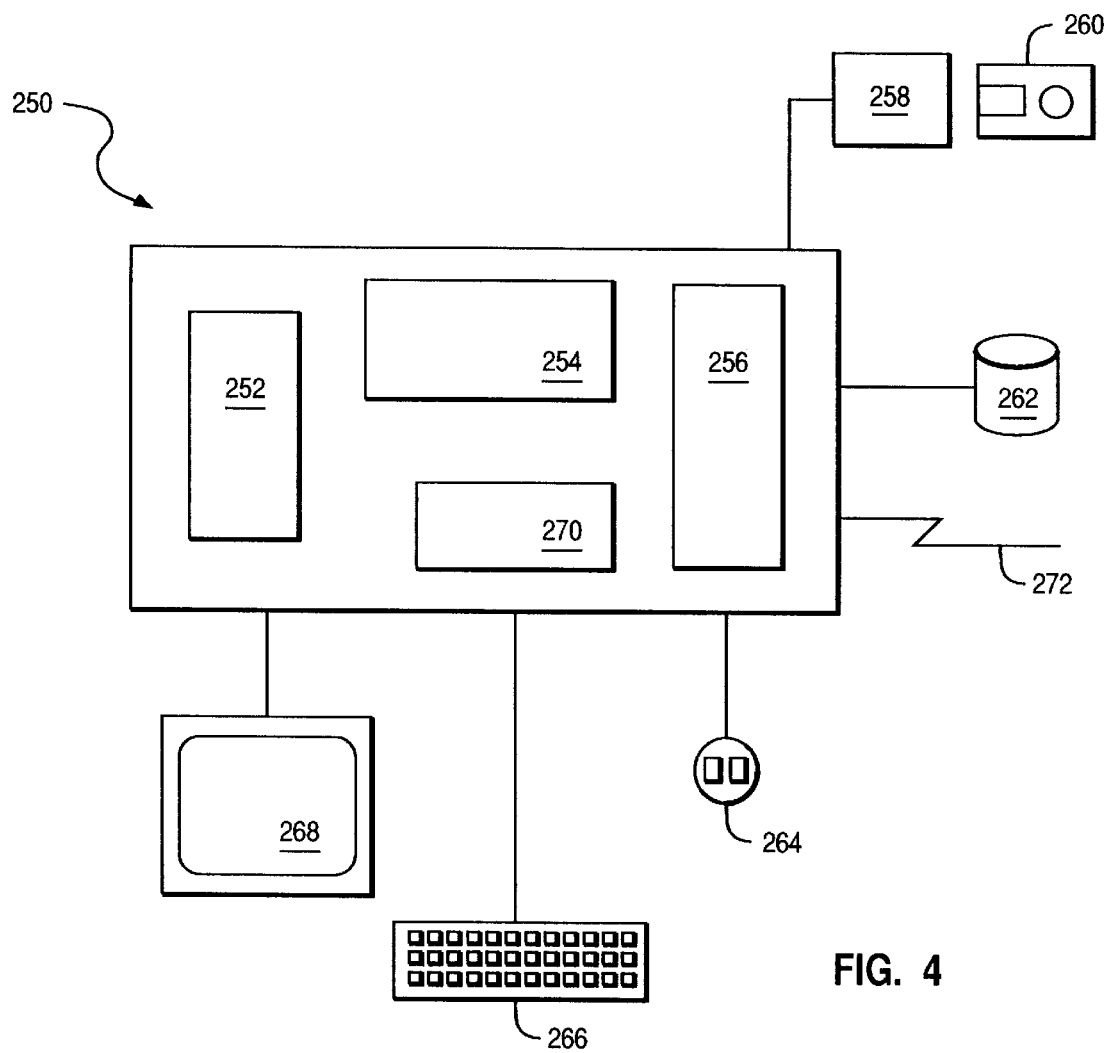
FIG. 4 is a diagram of a computer system incorporating the preferred embodiment of the present invention.

A typical computer system is shown in FIG. 4. Each system 250 contains one or more central processing units 252, volatile memory 254, and input/output controller 256. The input/output controller 256 manages writing to magnetic or optical disk storage 262, removable storage 258, 260 and to display 268, keyboard 266 and pointing device 264. System communication controller 270 manages communications with a network via communication link 272. This configurable is provided for exemplary purposes only and is not intended to be limiting. A commercially available computer system such as the IBM PS/2 computer or IBM RISC System/6000 workstation are examples of the types of systems on which the invention may be practiced. (PS/2 and RISC System/6000 are trademarks of the IBM Corporation.) As discussed above, the systems of a distributed environment may all be linked via a single communications bus sharing memory and disk storage.

Computer system 250 is controlled by an operating system such as the OS/2 operation system, or the AIX operating system (OS/2 and AIX are trademarks of the IBM Corporation.) Network communications may be managed by a network operating system such as Novell Netware operating system, or the IBM LAN Server operating system.

The present invention is practiced using a program or suitable hardware to control a computer system such as those described above.

Figure 5:
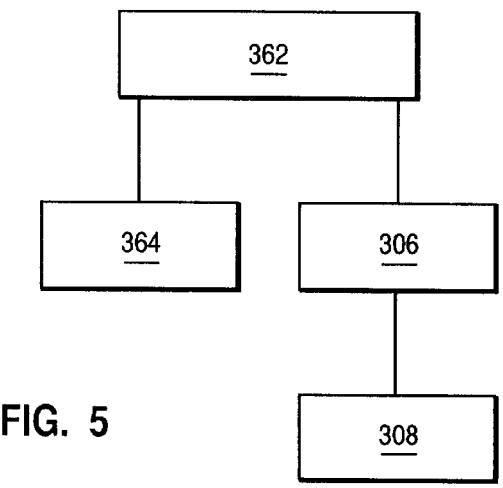
FIG. 5 is an example of a commit tree according to the present invention.

Both the X/Open DTP and OMG Object Transaction Service create a "commit tree" to control transaction change commitment during two phase commit. A commit tree is illustrated in FIG. 5. In an OMG Transaction Service implementation, the transaction manager is represented by a pair of objects: a Terminator object that controls termination of the transaction; and a Coordinator object that coordinates the involvement of resources in a transaction. The Coordinator object builds the commit tree and uses it to query recoverable objects at commitment time. The Terminator object is always associated with the originating transaction manager and provides the operations to either commit or rollback the overall transaction.

The first or root coordinator object 302 has responsibility to control the overall commitment of the transaction. Root coordinator object 302 requests commitment status from subordinate coordinator objects 304 and 306. Coordinator object 306 requests commitment status from subordinate 308. Each subordinate object coordinates resources for a portion of the distributed system. For example, system 202 may initiate a transaction and contain root coordinator object 302. As resources outside the process in which root coordinator object 302 is running are accessed, additional subordinate coordinators are added to the tree. If a recoverable object is accessed on system 204 by the application, a subordinate coordinator 304 would be added to the commit tree. If a recoverable object on system 228 is then accessed by the application, subordinate coordinator 306 would be added to the commit tree. Finally, if the recoverable object on system 228 accesses another recoverable object on system 218, subordinate coordinator 308 would be added to the commit tree and would be coordinated by subordinate coordinator 306 during commit sequence processing.

Creation of a hierarchy of coordinators simplifies transaction processing because each coordinator must send messages only to those directly below it in the hierarchy. Each subordinate coordinator is responsible for originating messages to and consolidating messages from its subordinates. This reduces overall message traffic.

Interposition is the process by which a subordinate controller is added between a root controller and a transaction participant. A transaction including context information is exported from the original transaction domain to a second, importing domain. This occurs when resources in another domain must participate in a particular transaction. The importing domain receives the context information and uses it to create a subordinate coordinator to handle the functions of coordinator in the importing domain. Interposition allows cooperating Transaction Services to share the responsibility for completing a transaction.

The preferred embodiment of the present invention uses the facilities of the IBM System Object Model (SOMobjects) language neutral object library and the Distributed System Object Model (DSOM) implementation. (SOMobjects and DSOM are trademarks of IBM.) This allows ready exchange of messages between distributed objects. The present invention, however, is generally applicable to any ORB environment and is not limited to DSOM environments.

Figure 6:
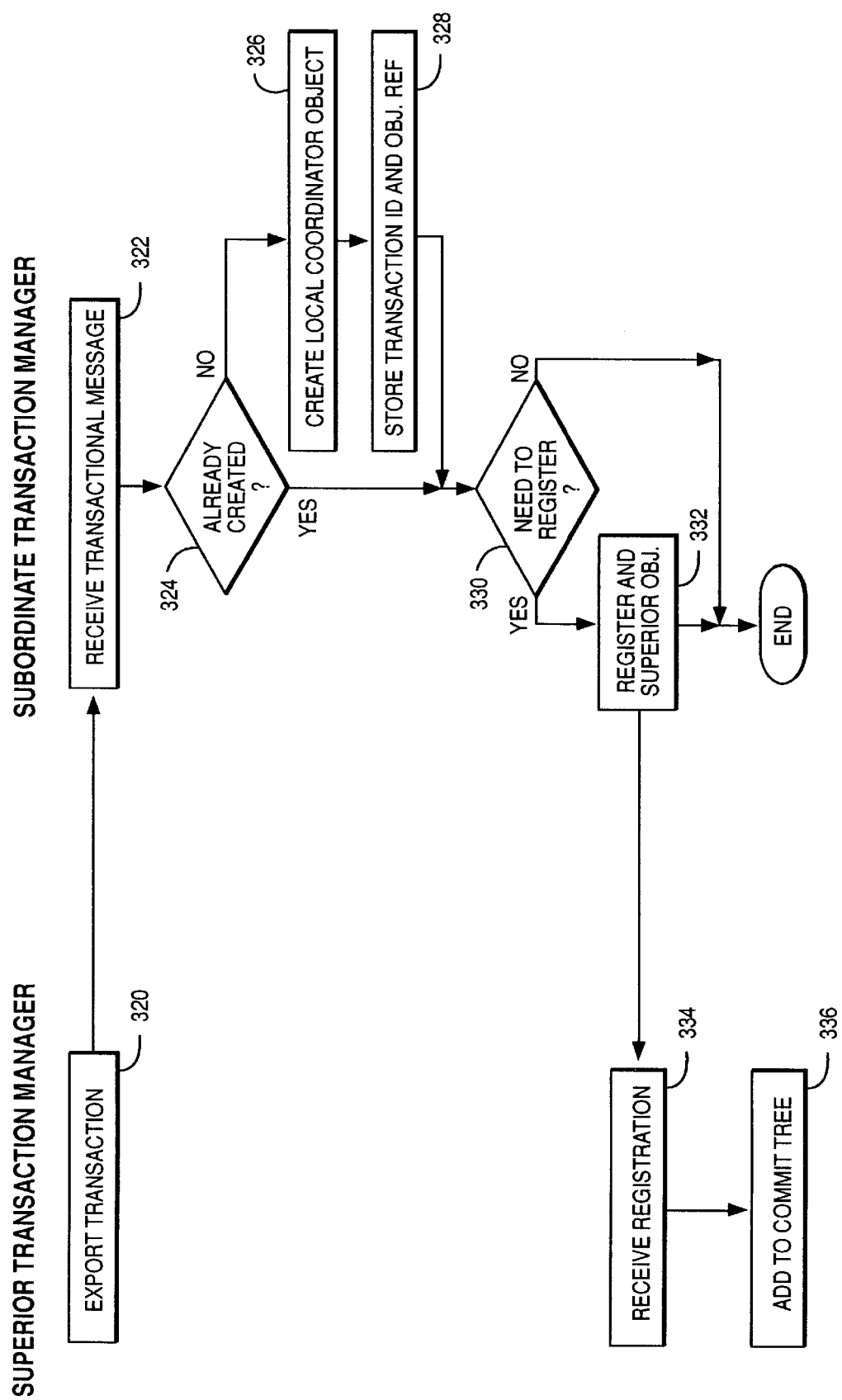
FIG. 6 is a flowchart describing the process steps of the preferred embodiment of the present invention.

The novel interposition and dynamic registration system of the present invention is illustrated in FIG. 6. FIG. 6 illustrates the process steps that occur at a "superior transaction manager" and "subordinate transaction manager." The hierarchical nature of distributed transaction processing means that each transaction manager may have multiple subordinate transaction managers and that each subordinate may also have several subordinate transaction managers.

The superior transaction manager exports a transaction 320 to another transaction manager. Export occurs when a transaction manager determines that the transaction requires access to or modification of a resource that is not present in the current domain. The object exporting the transaction extracts identifying information from the local coordinator and passes that information to the importing transaction manager domain via the transaction context. The importing transaction manager domain performs interposition (i.e. establishes a subordinate coordinator between the superior coordinator and the participating resource) using the extracted information. In the preferred embodiment, the information passed to the importing domain via the transaction context includes the object reference in the exporting system and a globally unique identifier (e.g. the X/Open XID). Object orientation facilitates implementation of a system for more efficiently managing the commit process. All interactions with the communications facility are totally contained within the object message passing mechanism. The preferred embodiment implements a process where the object messaging services cooperate with the transaction manager to create a system having dynamic registration properties.

The importing domain receives the exported message 322. The global transaction identifier is tested to determine whether or not this transaction is already known in the importing domain. If the transaction is already known, no further action is required since registration has previously occurred. If not, a new coordinator object is created 326. The new coordinator object encapsulates the object reference of the superior and the globally unique transaction identifier 328.

The subordinate coordinator is not automatically registered with the superior coordinator and therefore is not added to the commit tree. The subordinate coordinator may decide to register with the superior coordinator at the first visit of a transaction or at a later visit. The subordinate must register whenever it has recoverable resources. Thus, a transaction that causes a recoverable resource to change would require that the subordinate coordinator register. Read-only transactions or others that do not lead to recoverable changes do not require registration. The subordinate domain may contain many objects. Only when one or more of these objects becomes recoverable does the subordinate coordinator need to register.

When the subordinate coordinator determines that dynamic registration is necessary 330 it transmits a registration request 332 to the superior coordinator. Encapsulation of the superior coordinator object reference and the global transaction identifier allow the subordinate controller to determine where registration is required. The superior transaction manager receives the registration request 334 and registers the subordinate coordinator with the Transaction Services by adding it to the commit table 336. A subordinate transaction manager appears as just another resource to the transaction coordinator with which it registers (the superior transaction coordinator in this case.) By appearing as just another resource to process, the processing model is significantly simplified by allowing registered resources representing resource managers to be processed identically to subordinate coordinators registered with the coordinator. The X/Open DTP model requires separate communication resources managers to access remote resources and must use separate logic to handle them. In our model, both local and remote resources are handled using a single set of logic.

The dynamic registration process ensures that only subordinate coordinators with recoverable resources are placed in the commit tree. When the Transaction Service sends commit sequences, they are sent only to those coordinators with recoverable resources. Only one message is sent to each subordinate coordinator regardless of the number of recoverable resources controlled by that coordinator. Thus, the message traffic at two phase commit is optimized.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for coordinating resource modification transaction requests to reduce message traffic in a computer implemented transaction processing system, the transaction processing system operating on one or more processors each having a plurality of resources that can be changed by said transaction processing system, the method comprising the steps of:

receiving a transaction request to modify one or more of said plurality of resources and assigning said transaction a global identifier;

creating a first coordinator for controlling modification of said one or more resources;

importing said transaction request to a plurality of subordinate transaction manager domains containing resources, said domains being organized as a hierarchy of superior and subordinate transaction manager domains, by creating a subordinate coordinator for each of said domains for controlling modification of said one or more resources in said domain, and encapsulating said global identifier, and a reference to a superior domain to which the subordinate domain is hierarchically related;

dynamically registering said subordinate coordinators with the coordinator of said superior domain only when the subordinate coordinator is coordinating resources that are modifiable by a transaction;

sending a transaction messages from superior coordinators only to registered, directly subordinate coordinators, thereby reducing message traffic.

2. The method of claim 1, further comprising the steps of:

terminating said transaction request based on a two phase commitment process comprising the steps of:

determining whether each of said dynamically registered subordinate coordinators is able to successfully make necessary modifications to said resources;

rolling back said resources to a state existing before receipt of said transaction if not all subordinate coordinators respond affirmatively; and committing said modifications to said resources if all subordinate coordinators respond affirmatively.

3. The method of claim 1, further comprising the steps of:

testing to determine the number of subordinate coordinators registered with said first coordinator; and terminating said transaction request using a one phase commit if said test determines that only one subordinate coordinator is involved.

4. A transaction processing system for updating computer resources in one or more computer systems interconnected by a communications network, said computer systems having at least one processor and memory, the system comprising:

means for receiving a transaction;

means for assigning a global identifier to said transaction;

means for creating a global coordinator for ensuring that the transaction updates all affected resources or none;

means for communicating said transaction to other transaction domains in others of said processors for update of locally contained resources, said transaction domains being organized as a hierarchy of superior and subordinate transaction domains;

means for creating a subordinate controller in each of said others of said processors, said subordinate controller controlling resources in said subordinate transaction domain, said subordinate controller encapsulating the global identifier and a reference to a superior domain to which the subordinate domain is hierarchically related;

means for dynamically registering said subordinate controllers with the coordinator of said superior domain only when the resources of said subordinate coordinator are modifiable by a transaction, said superior coordinator communicating only with said registered subordinates thereby reducing message traffic.

5. The system of claim 4, further comprising:

means for performing two phase commitment processing of said transaction, said means for performing including:

means for determining whether each of said subordinate coordinators is able to successfully update locally controlled resources;

means for collecting subordinate controller responses;

means for instructing each of said subordinate controllers to perform said updates if all subordinates respond affirmatively; and means for instructing each subordinate controller to roll back all resource updates if all subordinates do not respond affirmatively.

6. The system of claim 4, further comprising:

means for testing to determine a number of registered subordinate coordinators;

means for performing two phase commitment processing if said number is greater than one; and means for performing one phase commitment processing if said number is equal to one.

7. The method of claim 1, wherein the hierarchy of transaction manager domains has at least three levels.

8. The system of claim 4, wherein the hierarchy of transaction domains has at least three levels.

* * * * *